(12) United States Patent
Yokoyama

(10) Patent No.: US 11,210,829 B2
(45) Date of Patent: Dec. 28, 2021

(54) IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventor: Yukinori Yokoyama, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 161 days.

(21) Appl. No.: 16/550,860

(22) Filed: Aug. 26, 2019

(65) Prior Publication Data

US 2020/0105036 A1 Apr. 2, 2020

(30) Foreign Application Priority Data

Sep. 27, 2018 (JP) ............................... JP2018-181689

(51) Int. Cl.
| | |
|---|---|
| G06K 9/00 | (2006.01) |
| G06T 11/60 | (2006.01) |
| G06F 16/583 | (2019.01) |
| G11B 27/034 | (2006.01) |

(52) U.S. Cl.
CPC .......... *G06T 11/60* (2013.01); *G06F 16/5838* (2019.01); *G06K 9/00718* (2013.01); *G11B 27/034* (2013.01)

(58) Field of Classification Search
None
See application file for complete search history.

(56) References Cited

U.S. PATENT DOCUMENTS

| | | | |
|---|---|---|---|
| 2007/0103565 A1* | 5/2007 | Xu ...................... | G06K 9/00664 348/231.2 |
| 2008/0234862 A1* | 9/2008 | Funada ................... | G06Q 30/02 700/246 |
| 2011/0243453 A1 | 10/2011 | Kashima et al. | |
| 2015/0086116 A1* | 3/2015 | Yamaji ............... | G06K 9/00684 382/190 |
| 2015/0286898 A1* | 10/2015 | Di ........................... | G06F 16/58 382/224 |
| 2016/0078322 A1* | 3/2016 | Yamaji ................. | G06K 9/6267 382/224 |
| 2017/0032214 A1* | 2/2017 | Krenzer ................... | G06T 7/77 |

(Continued)

FOREIGN PATENT DOCUMENTS

| | | |
|---|---|---|
| JP | 4232774 B2 | 3/2009 |
| JP | 2011-170690 A | 9/2011 |

(Continued)

*Primary Examiner* — Delomia L Gilliard
(74) *Attorney, Agent, or Firm* — Studebaker & Brackett PC

(57) ABSTRACT

A hobby determining unit counts the number of times of appearances of tag information by using the number of imaging days of the images, for each kind of the tag information, and determines that a first user has a hobby related to the tag information for which a ratio of the number of times of appearances of the tag information to the total number of times of appearances of all kinds of the tag information items is equal to or greater than a threshold value, or counts the number of times of appearances of the tag information by using the number of the images, and determines that a first user has a hobby related to the tag information for which the number of times of appearances of the tag information is equal to or greater than the threshold value.

24 Claims, 4 Drawing Sheets

(56) References Cited

U.S. PATENT DOCUMENTS

| | | | | |
|---|---|---|---|---|
| 2017/0083795 | A1* | 3/2017 | Ono | G06K 9/00677 |
| 2017/0091594 | A1* | 3/2017 | Yano | G06K 9/4652 |
| 2017/0351417 | A1* | 12/2017 | Manico | G06F 16/50 |
| 2018/0144214 | A1* | 5/2018 | Hsieh | G06K 9/036 |
| 2020/0104599 | A1* | 4/2020 | Ito | G06K 9/4604 |
| 2020/0104600 | A1* | 4/2020 | Usuki | G06F 16/51 |

FOREIGN PATENT DOCUMENTS

| | | |
|---|---|---|
| JP | 2011-257868 A | 12/2011 |
| JP | 5141015 B2 | 2/2013 |
| JP | 2015-089112 A | 5/2015 |
| JP | 2016-062122 A | 4/2016 |

* cited by examiner

IMAGE PROCESSING DEVICE, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2018-181689, filed on Sep. 27, 2018. The above application(s) is hereby expressly incorporated by reference, in its entirety, into the present application.

BACKGROUND OF THE INVENTION

1. Field of the Invention

The present invention relates to an image processing device, an image processing method, a program, and a recording medium that determine a hobby of a user from an image set owned by the user.

2. Description of the Related Art

An image owned by a user is published to any user who uses a social networking service (SNS) or is shared with only a sharing partner by using the SNS. In general, popular contents and contents that may be of interest to the user who uses the SNS are displayed in the SNS.

In a case where the contents that may be of interest to the user are displayed, as long as a hobby of the user can be determined based on an image set owned by the user, contents matching the hobby can be displayed.

As a general technology related to image processing, a subject recognition technology for recognizing subjects (persons and objects other than the persons) appearing on an image has been known. Due to the use of the technology of the subject recognition, it is possible to estimate the subject appearing in the image, for example, a table in the image, a cup in the image, a person appearing in the image, and a person appearing in the image being female.

As stated above, it is possible to recognize the subject appearing in the image by using the existing technology, but the user may not necessarily have the hobby related to the subject appearing in the image. For example, there are hobbies of the user which are directly seen on the subject appearing in the image such as gourmet, electric railways, alcohol labels, or manholes, whereas there are hobbies of the user which are not directly seen in the image such as "travel" and "listening to music".

Here, the related arts related to the present invention include JP2011-170690A, JP2011-257868A, JP2015-089112A, JP4232774B, JP2016-062122A, and JP5141015B.

JP2011-170690A describes an information processing device that analyzes a theme for each image data set including a plurality of image data items based on image information extracted from image data, and selects a combination of predetermined processing stored in association with the theme with the image data set based on the theme.

JP2011-257868A describes an image server that analyzes image data received from a terminal device, extracts preference information related to preference of a user of the terminal device, selects relevant information related to the extracted preference information from a database, and transmits the selected relevant information to the terminal device.

JP2015-089112A describes an image processing device that determines a theme of a candidate image set based on image analysis information of an image included in the candidate image set, selects a template based on the theme of the candidate image set, and creates a recommended combination image in which the image included in the candidate image set is laid out on a merchandise template.

JP4232774B describes that an image or Exif information is input to a personal computer from a digital camera, metadata is extracted from the image itself and the Exif information of the image, and an event when the image is captured is identified based on the extracted metadata.

JP2016-062122A describes that an image set owned by a user is obtained, image analysis of each image is performed, a theme of the image set is determined based on image analysis information, and preference of the user is analyzed based on the theme of the image set.

JP5141015B relates to not an image but a product, and describes that information items regarding products are received from tags assigned to a plurality of products owned by a user, product names associated with the information items regarding the products are obtained by searching a database with the information regarding the product as a key, the products are clustered, a hobby corresponding to the products included in each cluster is specified for each cluster, a result associated with the specified hobby is obtained from a result storage unit, and the hobby of which the number of times hobby information is obtained is equal to or greater than a threshold value is estimated to be the hobby of the user based on the result.

SUMMARY OF THE INVENTION

An object of the present invention is to provide an image processing device, an image processing method, a program, and a recording medium which are capable of accurately determining a hobby of a user from an image set owned by the user.

In order to achieve the object, a first aspect of the present invention provides an image processing device comprising an image receiving unit that receives an input of an image set owned by a first user, an attribute information obtaining unit that obtains attribute information which is assigned to each image included in the image set and includes an imaging date and time of each image from each image, an image analyzing unit that performs analysis of the image including subject recognition for recognizing a subject appearing in the image for each image included in the image set, a tag information assigning unit that assigns tag information related to at least one of the attribute information of the image or the subject appearing in the image to the image for each image included in the image set, and a hobby determining unit that counts the number of times of appearances of the tag information by using the number of imaging days of the images, to which the tag information is assigned, for each kind of the tag information, and determines that the first user has a hobby related to the tag information for which a ratio of the number of times of appearances of the tag information counted by using the number of imaging days to the total number of times of appearances of all kinds of the tag information items assigned to the images included in the image set is equal to or greater than a threshold value, or counts the number of times of appearances of the tag information by using the number of the images, to which the tag information is assigned, for each kind of the tag information, and determines that the first user has a hobby related to the tag information for which the number of times of appearances of the tag information counted by using the number of images is equal to or greater than the threshold value.

A second aspect of the present invention provides an image processing device comprising an image receiving unit that receives an input of an image set owned by a first user, an attribute information obtaining unit that obtains attribute information which is assigned to each image included in the image set and includes an imaging date and time of each image from each image, an image analyzing unit that performs analysis of the image including subject recognition for recognizing a subject appearing in the image for each image included in the image set, a tag information assigning unit that assigns tag information related to at least one of the attribute information of the image or the subject appearing in the image to the image for each image included in the image set, and a scene detecting unit that detects a scene of the image based on the attribute information and the tag information of the image for each image included in the image set. The tag information assigning unit assigns, as the tag information, scene tag information related to the scene of the image to the image for each image included in the image set, and the image processing device further comprises a hobby determining unit that counts the number of times of appearances of the scene tag information by using the number of imaging days of the images, to which the scene tag information is assigned, for each kind of the scene tag information, and determines that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value, or counts the number of times of appearances of the scene tag information by using the number of the images, to which the scene tag information is assigned, for each kind of the scene tag information, and determines that the first user has a hobby related to the scene tag information for which the number of times of appearances of the scene tag information counted by using the number of images is equal to or greater than the threshold value.

A third aspect of the present invention provides an image processing device comprising an image receiving unit that receives an input of an image set owned by a first user, an attribute information obtaining unit that obtains attribute information which is assigned to each image included in the image set and includes an imaging date and time of each image from each image, an image analyzing unit that performs analysis of the image including subject recognition for recognizing a subject appearing in the image for each image included in the image set, a tag information assigning unit that assigns tag information related to at least one of the attribute information of the image or the subject appearing in the image to the image for each image included in the image set, a group extracting unit that extracts an image group including two or more images from the image set based on the imaging date and time of each image, and an event determining unit that determines an event occurring in the image group based on the attribute information and the tag information of the image included in the image group for each image group extracted from the image set. The tag information assigning unit assigns, as the tag information, event tag information related to the event to the event and each image captured in the event for each event occurring in the image group extracted from the image set, and the image processing device further comprises a hobby determining unit that counts the number of times of appearances of the event tag information by using the number of imaging days of the images, to which the event tag information is assigned, or the number of the events, to which the event tag information is assigned, for each kind of the event tag information, and determines that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value, or counts the number of times of appearances of the event tag information by using the number of the images, to which the event tag information is assigned, for each kind of the event tag information, and determines that the first user has a hobby related to the event tag information for which the number of times of appearances of the event tag information counted by using the number of images is equal to or greater than the threshold value.

In the image processing device according to the first aspect, it is preferable that a fourth aspect of the present invention further comprises a scene detecting unit that detects a scene of the image based on the attribute information and the tag information of the image for each image included in the image set. It is preferable that the tag information assigning unit assigns, as the tag information, scene tag information related to the scene of the image to the image for each image included in the image set, and the hobby determining unit counts the number of times of appearances of the scene tag information by using the number of imaging days of the images, to which the scene tag information is assigned, for each kind of the scene tag information, and determines that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value, or counts the number of times of appearances of the scene tag information by using the number of the images, to which the scene tag information is assigned for each kind of the scene tag information, and determines that the first user has a hobby related to the scene tag information for which the number of times of appearances of the scene tag information counted by using the number of images is equal to or greater than the threshold value.

In the image processing device according to any one of the first, second, and fourth aspects, it is preferable that a fifth aspect of the present invention further comprises a group extracting unit that extracts an image group including two or more images from the image set based on the imaging date and time of each image, and an event determining unit that determines an event occurring in the image group based on the attribute information and the tag information of the image included in the image group for each image group extracted from the image set. It is preferable that the tag information assigning unit assigns, as the tag information, event tag information related to the event to the event and each image captured in the event for each event occurring in the image group extracted from the image set, and the hobby determining unit counts the number of times of appearances of the event tag information by using the number of imaging days of the images, to which the event tag information is assigned, or the number of the events, to which the event tag information is assigned, for each kind of the event tag information, and determines that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value, or counts the number of times of appearances of the event tag information by using the number of the images, to which the event tag information is assigned, for each kind of the event tag information, and determines that the first user has a hobby related to the event tag information for which the number of times of appearances of the event tag information counted by using the number of images is equal to or greater than the threshold value.

In the image processing device according to any one of the first, second, and fourth aspects, it is preferable that the image processing device further comprises a threshold value setting unit that sets the threshold value for each kind of the tag information.

In the image processing device according to the third or fifth aspect, it is preferable that the image processing device further comprises a threshold value setting unit that sets the threshold value for each kind of the tag information.

It is preferable that the image processing device further comprises a cost setting unit that sets cost per event for each event occurring in the image group extracted from the image set. It is preferable that the threshold value setting unit sets the threshold value to be smaller as the cost per event set by the cost setting unit becomes higher.

It is preferable that the image processing device further comprises a home location analyzing unit that analyzes a home location of the first user from at least one of an imaging location included in the attribute information of each image or account information of the first user including information of the home location of the first user, an imaging location analyzing unit that analyzes an imaging location of the image captured in the event based on the imaging location included in the attribute information of the image captured in the event for each event occurring in the image group extracted from the image set, and a distance calculating unit that calculates a distance between the home location and the imaging location for each event occurring in the image group extracted from the image set. It is preferable that the threshold value setting unit sets the threshold value to be smaller as the distance calculated by the distance calculating unit becomes longer.

It is preferable that the hobby determining unit excludes the tag information, among all kinds of the tag information items assigned to the images included in the image set owned by all the users, of which the ratio of the number of times of appearances to the total number of times of appearances of all kinds of the tag information items assigned to the images included in the image sets owned by all the users is equal to or greater than a threshold value from all kinds of the tag information items assigned to the images included in the image set owned by the first user.

It is preferable that the hobby determining unit determines that a hobby related to the tag information of which the ratio of the number of times of appearances of one kind of the tag information assigned to the images included in the image set owned by the first user to the number of times of appearances of the one kind of the tag information assigned to the images included in the image sets owned by all the users is equal to or greater than a threshold value is an important hobby more than a hobby related to another tag information.

It is preferable that the image processing device further comprises an image sharing unit that shares images between the first user and a second user. In a case where images owned by the second user are shared with the first user, it is preferable that the image receiving unit adds the shared images as the image set owned by the first user.

In a case where among the images which are shared with the first user and are owned by the second user, a first image is saved as the image set owned by the first user and a second image is not saved as the image set owned by the first user, it is preferable that the hobby determining unit performs weighting such that the number of times of appearances of the tag information assigned to the first image is greater than the number of times of appearances of the tag information assigned to the second image.

A sixth aspect of the present invention provides an image processing method comprising receiving, by an image receiving unit, an input of an image set owned by a first user, obtaining, by an attribute information obtaining unit, attribute information which is assigned to each image included in the image set and includes an imaging date and time of each image from each image, performing, by an image analyzing unit, analysis of the image including subject recognition for recognizing a subject appearing in the image for each image included in the image set, assigning, by a tag information assigning unit, tag information related to at least one of the attribute information of the image or the subject appearing in the image to the image for each image included in the image set, and counting, by a hobby determining unit, the number of times of appearances of the tag information by using the number of imaging days of the images, to which the tag information is assigned, for each kind of the tag information, and determining that the first user has a hobby related to the tag information for which a ratio of the number of times of appearances of the tag information counted by using the number of imaging days to the total number of times of appearances of all kinds of the tag information items assigned to the images included in the image set is equal to or greater than a threshold value, or counting the number of times of appearances of the tag information by using the number of the images, to which the tag information is assigned, for each kind of the tag information, and determining that the first user has a hobby related to the tag information for which the number of times of appearances of the tag information counted by using the number of images is equal to or greater than the threshold value.

A seventh aspect of the present invention provides an image processing method comprising receiving, by an image receiving unit, an input of an image set owned by a first user, obtaining, by an attribute information obtaining unit, attribute information which is assigned to each image included in the image set and includes an imaging date and time of each image from each image, performing, by an image analyzing unit, analysis of the image including subject recognition for recognizing a subject appearing in the image for each image included in the image set, assigning, by a tag information assigning unit, tag information related to at least one of the attribute information of the image or the subject appearing in the image to the image for each image included in the image set, detecting, by a scene detecting unit, a scene of the image based on the attribute information and the tag information of the image for each image included in the image set, assigning, by the tag information assigning unit, as the tag information, scene tag information related to the scene of the image to the image for each image included in the image set, and counting, by a hobby determining unit, the number of times of appearances of the scene tag information by using the number of imaging days of the images, to which the scene tag information is assigned, for each kind of the scene tag information, determining that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value, or counting the number of times of appearances of the scene tag information by using the number of the images, to which the scene tag information is assigned, for each kind of the scene tag information, and determining that the first user has a hobby related to the scene tag information for which the number of times of appearances of the scene tag information counted by using the number of images is equal to or greater than the threshold value.

An eighth aspect of the present invention provides an image processing method comprising receiving, by an image receiving unit, an input of an image set owned by a first user, obtaining, by an attribute information obtaining unit, attribute information which is assigned to each image included in the image set and includes an imaging date and time of each image from each image, performing, by an image analyzing unit, analysis of the image including subject recognition for recognizing a subject appearing in the image for each image included in the image set, assigning, by a tag information assigning unit, tag information related to at least one of the attribute information of the image or the subject appearing in the image to the image for each image included in the image set, extracting, by a group extracting unit, an image group including two or more images from the image set based on the imaging date and time of each image, determining, by an event determining unit, an event occurring in the image group based on the attribute information and the tag information of the image included in the image group for each image group extracted from the image set, assigning, by the tag information assigning unit, as the tag information, event tag information related to the event to the event and each image captured in the event for each event occurring in the image group extracted from the image set, and counting, by a hobby determining unit, the number of times of appearances of the event tag information by using the number of imaging days of the images, to which the event tag information is assigned, or the number of the events, to which the event tag information is assigned, for each kind of the event tag information, and determining that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value, or counting the number of times of appearances of the event tag information by using the number of the images, to which the event tag information is assigned, for each kind of the event tag information, and determining that the first user has a hobby related to the event tag information for which the number of times of appearances of the event tag information counted by using the number of images is equal to or greater than the threshold value.

In the image processing method according to the sixth aspect, it is preferable that a ninth aspect of the present invention further comprises detecting, by a scene detecting unit, a scene of the image based on the attribute information and the tag information of the image for each image included in the image set, assigning, by the tag information assigning unit, as the tag information, scene tag information related to the scene of the image to the image for each image included in the image set, and counting, by the hobby determining unit, the number of times of appearances of the scene tag information by using the number of imaging days of the images, to which the scene tag information is assigned, for each kind of the scene tag information, and determining that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value, or counting the number of times of appearances of the scene tag information by using the number of the images, to which the scene tag information is assigned, for each kind of the scene tag information, and determining that the first user has a hobby related to the scene tag information for which the number of times of appearances of the scene tag information counted by using the number of images is equal to or greater than the threshold value.

In the image processing method according to any one of the sixth, seventh, and ninth aspects, it is preferable that a tenth aspect of the present invention further comprises extracting, by a group extracting unit, an image group including two or more images from the image set based on the imaging date and time of each image, determining, by an event determining unit, an event occurring in the image group based on the attribute information and the tag information of the image included in the image group for each image group extracted from the image set, assigning, by the tag information assigning unit, as the tag information, event tag information related to the event to the event and each image captured in the event for each event occurring in the image group extracted from the image set, and counting, by the hobby determining unit, the number of times of appearances of the event tag information by using the number of imaging days of the images, to which the event tag information is assigned, or the number of the events, to which the event tag information is assigned, for each kind of the event tag information, and determining that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value, or counting the number of times of appearances of the event tag information by using the number of the images, to which the event tag information is assigned, for each kind of the event tag information, and determining that the first user has a hobby related to the event tag information for which the number of times of appearances of the event tag information counted by using the number of images is equal to or greater than the threshold value.

An eleventh aspect of the present invention provides a program causing a computer to execute the steps of the image processing method according to any one of the image processing methods.

A twelfth aspect of the present invention provides a computer-readable recording medium having a program causing a computer to execute the steps of the image processing method according to any one of the image processing methods recorded thereon.

A thirteenth aspect of the present invention provides an image processing device comprising an image receiving unit that receives an input of an image set owned by a first user, an attribute information obtaining unit that obtains attribute information which is assigned to each image included in the image set and includes an imaging date and time of each image from each image, an image analyzing unit that performs analysis of the image including subject recognition for recognizing a subject appearing in the image for each image included in the image set, a tag information assigning unit that assigns tag information related to at least one of the attribute information of the image or the subject appearing in the image to the image for each image included in the image set, a hobby determining unit that counts the number of times of appearances of the tag information by using the number of imaging days of the images, to which the tag information is assigned, for each kind of the tag information, and determines that a first user has a hobby related to the tag information for which a ratio of the number of times of appearances of the tag information counted by using the number of imaging days to the total number of times of appearances of all kinds of the tag information items assigned to the images included in the image set is equal to or greater than a threshold value, or counts the number of times of appearances of the tag information by using the number of the images, to which the tag information is assigned, for each kind of the tag information, and determines that the first user has a hobby related to the tag information for which the number of times of appearances of the tag information counted by using the number of images is equal to or greater than the threshold value. The image receiving unit, the attribute information obtaining unit, the image analyzing unit, the tag information assigning unit, and the hobby determining unit are constituted by dedicated hardware or processors that execute programs.

A fourteenth aspect of the present invention provides an image processing device comprising an image receiving unit that receives an input of an image set owned by a first user, an attribute information obtaining unit that obtains attribute information which is assigned to each image included in the image set and includes an imaging date and time of each image from each image, an image analyzing unit that performs analysis of the image including subject recognition for recognizing a subject appearing in the image for each image included in the image set, a tag information assigning unit that assigns tag information related to at least one of the attribute information of the image or the subject appearing in the image to the image for each image included in the image set, and a scene detecting unit that detects a scene of the image based on the attribute information and the tag information of the image for each image included in the image set. It is preferable that the tag information assigning unit assigns, as the tag information, scene tag information related to the scene of the image to the image for each image included in the image set, and the image processing device further comprises a hobby determining unit that counts the number of times of appearances of the scene tag information by using the number of imaging days of the images, to which the scene tag information is assigned, for each kind of the scene tag information, and determines that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value, or counts the number of times of appearances of the scene tag information by using the number of the images, to which the scene tag information is assigned, for each kind of the scene tag information, and determines that the first user has a hobby related to the scene tag information for which the number of times of appearances of the scene tag information counted by using the number of images is equal to or greater than the threshold value. The image receiving unit, the attribute information obtaining unit, the image analyzing unit, the tag information assigning unit, the scene detecting unit, and the hobby determining unit are constituted by dedicated hardware or processors that execute programs.

A fifteenth aspect of the present invention provides an image processing device comprising an image receiving unit that receives an input of an image set owned by a first user, an attribute information obtaining unit that obtains attribute information which is assigned to each image included in the image set and includes an imaging date and time of each image from each image, an image analyzing unit that performs analysis of the image including subject recognition for recognizing a subject appearing in the image for each image included in the image set, a tag information assigning unit that assigns tag information related to at least one of the attribute information of the image or the subject appearing in the image to the image for each image included in the image set, a group extracting unit that extracts an image group including two or more images from the image set based on the imaging date and time of each image, and an event determining unit that determines an event occurring in the image group based on the attribute information and the tag information of the image included in the image group for each image group extracted from the image set. It is preferable that the tag information assigning unit assigns, as the tag information, event tag information related to the event to the event and each image captured in the event for each event occurring in the image group extracted from the image set, and the image processing device further comprises a hobby determining unit that counts the number of times of appearances of the event tag information by using the number of imaging days of the images, to which the event tag information is assigned, or the number of the events, to which the event tag information is assigned, for each kind of the event tag information, and determines that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value, or counts the number of times of appearances of the event tag information by using the number of the images, to which the event tag information is assigned, for each kind of the event tag information, and determines that the first user has a hobby related to the event tag information for which the number of times of appearances of the event tag information counted by using the number of images is equal to or greater than the threshold value. The image receiving unit, the attribute information obtaining unit, the image analyzing unit, the tag information assigning unit, the group extracting unit, the event determining unit, and the hobby determining unit are constituted by dedicated hardware or processors that execute programs.

In the image processing device of the thirteenth aspect, it is preferable that a sixteenth aspect of the present invention provides further comprise a scene detecting unit that detects a scene of the image based on the attribute information and the tag information of the image for each image included in the image set. It is preferable that the scene detecting unit is constituted by dedicated hardware or a processor that executes a program. It is preferable that the tag information assigning unit assigns, as the tag information, scene tag information related to the scene of the image to the image for each image included in the image set, and the hobby determining unit counts the number of times of appearances of the scene tag information by using the number of imaging days of the images, to which the scene tag information is assigned, for each kind of the scene tag information, and determines that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value, or counts the number of times of appearances of the scene tag information by using the number of the images, to which the scene tag information is assigned for each kind of the scene tag information, and determines that the first user has a hobby related to the scene tag information for which the number of times of appearances of the scene tag information counted by using the number of images is equal to or greater than the threshold value.

In the image processing device according to any one of the thirteenth, fourteenth, and sixteenth aspects, it is preferable that a seventeenth aspect of the present invention further comprises a group extracting unit that extracts an image group including two or more images from the image set based on the imaging date and time of each image, and an event determining unit that determines an event occurring in the image group based on the attribute information and the tag information of the image included in the image group for each image group extracted from the image set. The group extracting unit and the event determining unit are constituted by dedicated hardware or processors that execute programs. It is preferable that the tag information assigning unit assigns, as the tag information, event tag information related to the event to the event and each image captured in the event for each event occurring in the image group extracted from the image set, and the hobby determining unit counts the number of times of appearances of the event tag information by using the number of imaging days of the images, to which the event tag information is assigned, or the number of the events, to which the event tag information is assigned, for each kind of the event tag information, and determines that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value, or counts the number of times of appearances of the event tag information by using the number of the images, to which the event tag information is assigned, for each kind of the event tag information, and determines that the first user has a hobby related to the event tag information for which the number of times of appearances of the event tag information counted by using the number of images is equal to or greater than the threshold value.

In the image processing device according to any one of the thirteenth, fourteenth, and sixteenth aspects, it is preferable that the image processing device further comprises a threshold value setting unit that sets the threshold value for each kind of the tag information. It is preferable that the threshold value setting unit is constituted by dedicated hardware or a processor that executes a program.

In the image processing device according to the fifteenth or seventeenth aspect, it is preferable that the image processing device further comprises a threshold value setting unit that sets the threshold value for each kind of the tag information. It is preferable that the threshold value setting unit is constituted by dedicated hardware or a processor that executes a program.

It is preferable that the image processing device further comprises a cost setting unit that sets cost per event for each event occurring in the image group extracted from the image set. It is preferable that the cost setting unit is constituted by dedicated hardware or a processor that executes a program. It is preferable that the threshold value setting unit sets the threshold value to be smaller as the cost per event set by the cost setting unit becomes higher.

It is preferable that the image processing device further comprises a home location analyzing unit that analyzes a home location of the first user from at least one of an imaging location included in the attribute information of each image or account information of the first user including information of the home location of the first user, an imaging location analyzing unit that analyzes an imaging location of the image captured in the event based on the imaging location included in the attribute information of the image captured in the event for each event occurring in the image group extracted from the image set, and a distance calculating unit that calculates a distance between the home location and the imaging location for each event occurring in the image group extracted from the image set. It is preferable that the home location analyzing unit, the imaging location analyzing unit, and the distance calculating unit are constituted by dedicated hardware or processors that execute programs. It is preferable that the threshold value setting unit sets the threshold value to be smaller as the distance calculated by the distance calculating unit becomes longer.

It is preferable that the image processing device further comprises an image sharing unit that shares images between the first user and a second user. It is preferable that the image sharing unit is constituted by dedicated hardware or a processor that executes a program. It is preferable that in a case where images owned by the second user are shared with the first user, the image receiving unit adds the shared images as the image set owned by the first user.

According to the present invention, it is possible to accurately determine that the first user has the hobby related to the repeatedly and consistently seen tag information by counting the number of times of appearances of the tag information by using the number of imaging days of the images to which the tag information is assigned. It is possible to accurately determine the hobby of the first user even though the hobby of the first user is not directly seen on the image by determining the hobby of the first user by using the scene tag information and the event tag information.

DESCRIPTION OF THE PREFERRED EMBODIMENTS

Hereinafter, an image processing device, an image processing method, a program, and a recording medium according to an embodiment of the present invention will be described in detail based on preferred embodiments shown in the accompanying drawings.

Figure 1:
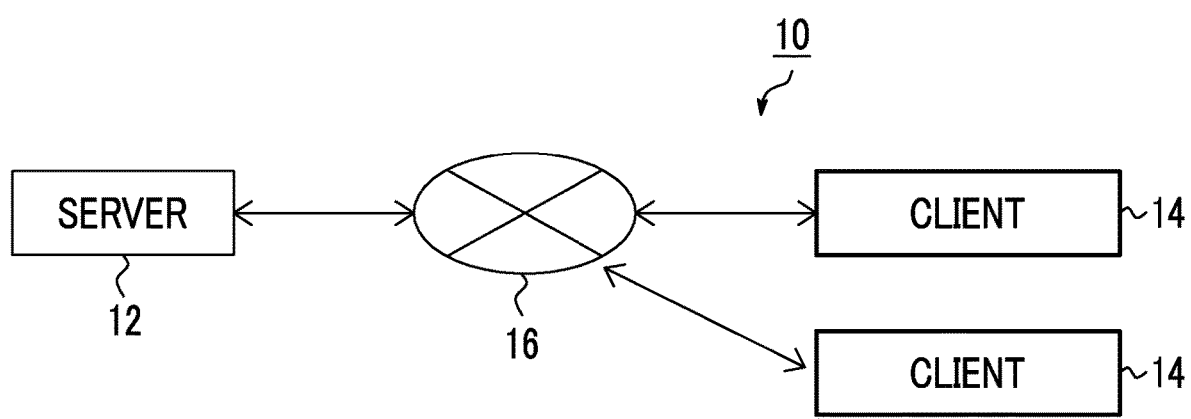
FIG. 1 is a block diagram of an embodiment showing a configuration of an image processing system according to an embodiment of the present invention.

FIG. 1 is a block diagram of an embodiment showing a configuration of an image processing system according to the embodiment of the present invention. An image processing system 10 shown in FIG. 1 comprises a server 12, and a plurality of clients 14 connected to the server 12 via a network 16.

The server 12 has a function of obtaining an image set owned by a plurality of users who uses the image processing system 10 and setting each image included in the image set owned by each of the plurality of users so as to publish each image to any user, so as to publish each image to only a sharing partner, or so as not to publish each image to the public. The number of servers 12 is not limited to one, but a plurality of servers may be used. The server is a workstation including a control device, a storage device, and a communication device.

The client 14 is an image processing device according to the embodiment of the present invention, and has a function of determining the user's hobby from the image set owned by the user. The client 14 is a desktop personal computer (PC), a laptop PC, a tablet PC, or a portable terminal such as a portable phone and a smartphone that includes a control device, an input device, a storage device, a communication device, and a display.

Figure 2:
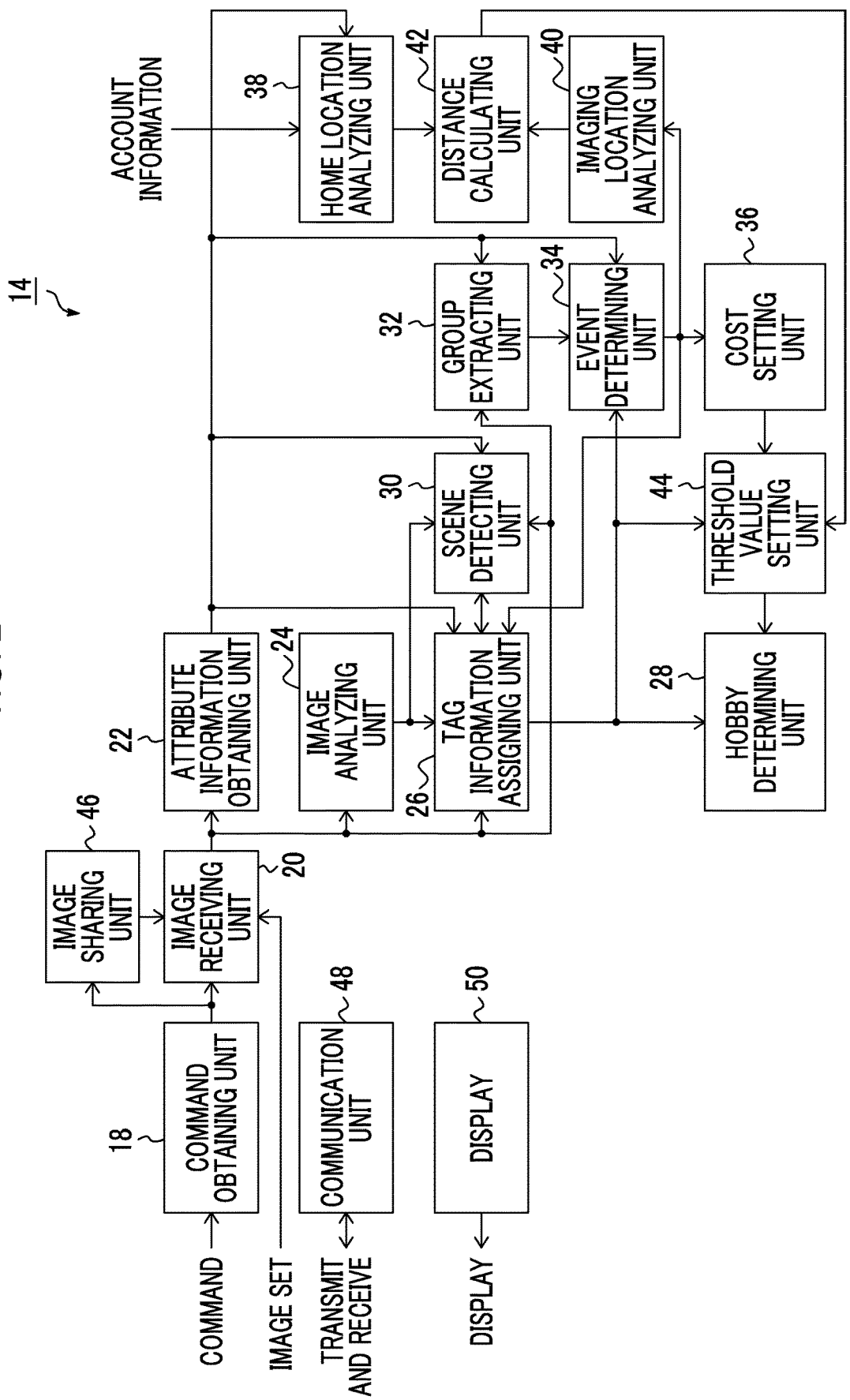
FIG. 2 is a block diagram of an embodiment showing a configuration of a client.

FIG. 2 is a block diagram of an embodiment showing a configuration of the client. The client 14 shown in FIG. 2 comprises a command obtaining unit 18, an image receiving unit 20, an attribute information obtaining unit 22, an image analyzing unit 24, a tag information assigning unit 26, a hobby determining unit 28, a scene detecting unit 30, a group extracting unit 32, an event determining unit 34, a cost setting unit 36, a home location analyzing unit 38, an imaging location analyzing unit 40, a distance calculating unit 42, a threshold value setting unit 44, an image sharing unit 46, a communication unit 48, and a display 50.

Hereinafter, the client 14 owned by a first user will be described. The first user is any one user of all users who use the image processing system 10. In the present embodiment, although the client 14 of the first user will be described, the client 14 owned by another user other than the first user has the same configuration and function.

In the client 14 of the first user, the command obtaining unit 18 initially obtains various commands input from the first user by using an input device such as a keyboard, a mouse, or a touch panel.

The first user inputs a command by using the input device while viewing a screen displayed on the display 50. The command input by the first user is not particularly limited, but the command includes a command to designate the image set, a command to set cost of an event, a command to select an image from images included in the image set, a command to set a sharing partner of the image, and a command to set the image so as to publish the image to the public, so as to share the image, or so as not to publish the image to the public.

Subsequently, the image receiving unit 20 receives an input of the image set owned by the first user according to the command to designate the image set. In other words, the image receiving unit 20 obtains the image group owned by the first user.

The image set owned by the first user is not particularly limited, but an image set stored in the storage device of the client 14 of the first user, an image set recorded in an external recording medium such as a universal serial bus (USB) memory, a secure digital (SD) memory, a compact disc (CD), a digital versatile disc (DVD), and a hard disk (HD), an image set stored in an online storage, and an image set posted to an SNS are included in the image set. The image includes a still image and a motion picture.

Subsequently, the attribute information obtaining unit 22 obtains attribute information which is assigned to each image included in the image set and includes an imaging date and time of each image from each image.

The attribute information can be assigned to each of the plurality of images included in the image set. The attribute information is information indicating an attribute of the image. For example, exchangeable image file format (Exif) information can be used as the attribute information. The Exif information is information regarding an imaging condition of the image, and includes, for example, information such as an imaging date and time of the image, an imaging location (positional information), a focal length, or exposure. The Exif information is assigned as header information of the image (image data) captured by a digital camera.

Subsequently, the image analyzing unit 24 performs image analysis including subject recognition for recognizing subjects (a person and an object other than the person) appearing in the image for each image included in the image set.

The subject recognition includes face detection, person recognition (face recognition), and object recognition (meat, fruit, flower, or cake). The image analysis is not particularly limited, but includes brightness determination, color evaluation, and blur evaluation.

Subsequently, the tag information assigning unit 26 assigns tag information to the image based on the attribute information of the image and the analyzing result of the image for each image included in the image set.

In the case of the present embodiment, the tag information assigning unit 26 assigns the tag information related to at least one of the attribute information of the image or the subject appearing in the image to the image for each image included in the image set.

The tag information is a name indicating the attribute information of the image, the subject appearing in the image, and an emotion read from the image. For example, in a case where an imaging year of the image is 2018, the tag information of "2018" is assigned to the image. In a case where the imaging location of the image is Tokyo, the tag information of "Tokyo" is assigned to the image. In a case where "meat" and a plurality of "persons" appear as the subjects in the image, the tag information items of "meat", "person", "get-together", and "girl-only gathering" are assigned to the image. In a case where "person" appearing in the image has a smile, the tag information items of "smile" and "enjoy" are assigned to the image. The emotion can be measured by measuring and detecting a heart rate, a respiration rate, a blood pressure, an electrocardiogram, a body temperature, and sweating by a wearable terminal, and by measuring and detecting a degree of opening of the pupil by a goggle type terminal.

The tag information assigning unit 26 can assign, as the tag in, scene tag information related to a scene of the image to the image for each image included in the image set.

The scene tag information is a name indicating the scene of the image. The scene indicates one scene such as "children", "sky", "sea", "school", or "sports day" at a point of time when one image is captured. For example, in a case where "precincts", "Japanese clothing", and "children" appear in the image, the scene tag information of "celebration of child's third, fifth, and seventh years of age" is assigned to the image.

The tag information assigning unit 26 can assign, as the tag information, event tag information related to an event to the event and each image captured in the event for each event occurring in the image group extracted from the image set.

The event tag information is a name indicating the event. The event indicates an event such as "entrance ceremony", "sports day", and "travel" occurring over a period for which the image group is captured. For example, in the image group captured for multiple days in succession, in a case where "landscape" and "cooking" appear, or in a case where "landmark" and "imaging location different from usual imaging" appear, the event tag information of "travel" is assigned to the event and each image captured in the event included in the image group.

The tag information, the scene tag information, and the event tag information can be manually assigned to the image by the first user. The tag information assigning unit 26 can use the tag information, the scene tag information, and the event tag information already assigned to the image without assigning the tag information, the scene tag information, and the event tag information to the image. At least two or more information items such as "children" and "sports day" of the tag information, the scene tag information, and the event tag information may be expressed by the same name.

Subsequently, the hobby determining unit 28 determines a hobby of the first user based on the number of times of appearances of the tag information for each kind of the tag information assigned to the images included in the image set.

The hobby determining unit 28 can count the number of times of appearances of the tag information by using the number of imaging days of the images, to which the tag information is assigned, for each kind of the tag information, and can determine that the first user has a hobby related to the tag information for which a ratio of the number of times of appearances of the tag information counted by using the number of imaging days to the total number of times of the appearances of all kinds of tag information items assigned to the images included in the image set is equal to or greater than a threshold value, or can count the number of times of appearances of the tag information by using the number of the images, to which the tag information is assigned, for each kind of the tag information, and can determine that the first user has a hobby related to the tag information for which the number of times of appearances of the tag information counted by using the number of images is equal to or greater than the threshold value.

The hobby determining unit 28 can count the number of times of appearances of the scene tag information by using the number of imaging days of the images, to which the scene tag information is assigned, for each kind of the scene tag information, and can determine that the first user has a hobby related to the scene tag information for which a ratio of the number of times of appearances of the scene tag information counted by using the number of imaging days to the total number of times of the appearances of all kinds of the scene tag information items assigned to the images included in the image set is equal to or greater than a threshold value, or can count the number of times of appearances of the scene tag information by using the number of the images, to which the scene tag information is assigned, for each kind of the scene tag information, and can determine that the first user has a hobby related to the scene tag information for which the number of times of appearances of the scene tag information counted by using the number of images is equal to or greater than the threshold value.

The hobby determining unit 28 can count the number of times of appearances of the event tag information by using the number of imaging days of the images, to which the event tag information is assigned, or the number of the events, to which the event tag information is assigned, for each kind of the event tag information, and can determine that the first user has a hobby related to the event tag information for which a ratio of the number of times of appearances of the event tag information counted by using the number of imaging days to the total number of times of the appearances of all kinds of event tag information items assigned to the images included in the image set is equal to or greater than a threshold value, or can count the number of times of appearances of the event tag information by using the number of the images, to which the event tag information is assigned, for each kind of the event tag information, and can determine that the first user has a hobby related to the event tag information for which the number of times of appearances of the event tag information counted by using the number of images is equal to or greater than the threshold value.

The hobby determining unit 28 can determine a probability that the first user will have the likelihood of the hobby related to the tag information, that is, a hobby according to the ratio of the number of times of appearances of the tag information counted by using the number of imaging days to the total number of times of the appearances of all kinds of tag information items assigned to the images included in the image set for each kind of the tag information. Similarly, the hobby determining unit may determine the likelihood of the hobby for the scene tag information and the event tag information.

Subsequently, the scene detecting unit 30 detects the scene of the image based on the attribute information the tag information of the image for each image included in the image set.

The scene detecting unit 30 integrates all the attribute information items of the image and all the tag information items assigned to the image, and detects a high context scene for the entire image. The high context scene is a scene such as "celebration of child's third, fifth, and seventh years of age" and "travel" capable of being read from the entire image. In contrast to the high context scene, a scene such as "children" capable of being detected from the subject appearing in the image is referred to as a low context scene.

Subsequently, the group extracting unit 32 extracts the image group including two or more images from the image set based on the imaging date and time of each image.

The group extracting unit 32 extracts, as the same image group, a plurality of images of which imaging dates and times are close to each other, that is, two or more images of which an imaging interval is less than a threshold value from the image set.

Subsequently, the event determining unit 34 determines the event occurring in the image group based on the attribute information items and the tag information items of the images included in the image group for each image group extracted from the image set.

The event determining unit 34 integrates all the attribute information items of the images included in the image group and all the tag information items assigned to the images included in the image group, and detects the high context event for the image group.

Subsequently, the cost setting unit 36 sets cost per event for each event occurring in the image group extracted from the image set.

The cost setting unit 36 may set the cost of the event for each kind of the event according to the command to set the cost of the event. Alternatively, for example, the cost setting unit can search for the cost of the event by using the Internet, and can set an average value of searching results of a plurality of costs, as the cost of the event.

Subsequently, the home location analyzing unit 38 analyzes a home location of the first user from at least one of the imaging location included in the attribute information of each image or account information of the first user including the information of the home location of the first user.

In a case where the attribute information including the imaging location is assigned to each image, for example, in a case where many images of the image set are captured at a location within the same range, it is possible to analyze that the location within this range is the home location of the first user. In a case where the first user uses the SNS, the information of the home location of the first user may be registered as the account information. In this case, it is possible to analyze the home location of the first user from the account information of the first user.

Subsequently, the imaging location analyzing unit 40 analyzes the imaging location of the image captured in the event based on the imaging location included in the attribute information of the image captured in the event for each event occurring in the image group extracted from the image set.

In a case where the image captured in the event is captured at the location within the same range, it is possible to analyze that the location within this range is the imaging location of the image captured in the event.

Subsequently, the distance calculating unit 42 calculates a distance between the home location and the imaging location for each event occurring in the image group extracted from the image set.

Subsequently, the threshold value setting unit 44 sets a threshold value used in the hobby determining unit 28 for each kind of the tag information assigned to the images included in the image set owned by the first user.

Subsequently, the image sharing unit 46 shares the image between the first user and a second user.

The second user is any one user or a plurality of users other than the first user of all the users who use the image processing system 10. The image sharing unit 46 sets the image selected according to the command to select the image so as to publish the image to any user or so as not to publish the image to the public according to the command to set the image so as to publish the image or so as not to publish the image to the public. The image sharing unit 46 shares the image selected according to the command to select the image with only the sharing partner set according to the command to set the sharing partner according to the command to share the image.

Subsequently, the communication unit 48 is the communication device of the client 14, and transmits and receives various data items to and from the communication device of the server 12.

For example, the communication unit 48 uploads the image (image data) stored in the storage device of the client 14 to the server 12 from the client 14 via the network 16, and downloads the image stored in the storage device of the server 12 to the client 14 from the server 12 via the network 16.

Next, an operation of the image processing system 10 in a case where the hobby of the first user is determined will be described with reference to a flowchart shown in FIG. 3 and a conceptual diagram shown in FIG. 4.

Figure 3:
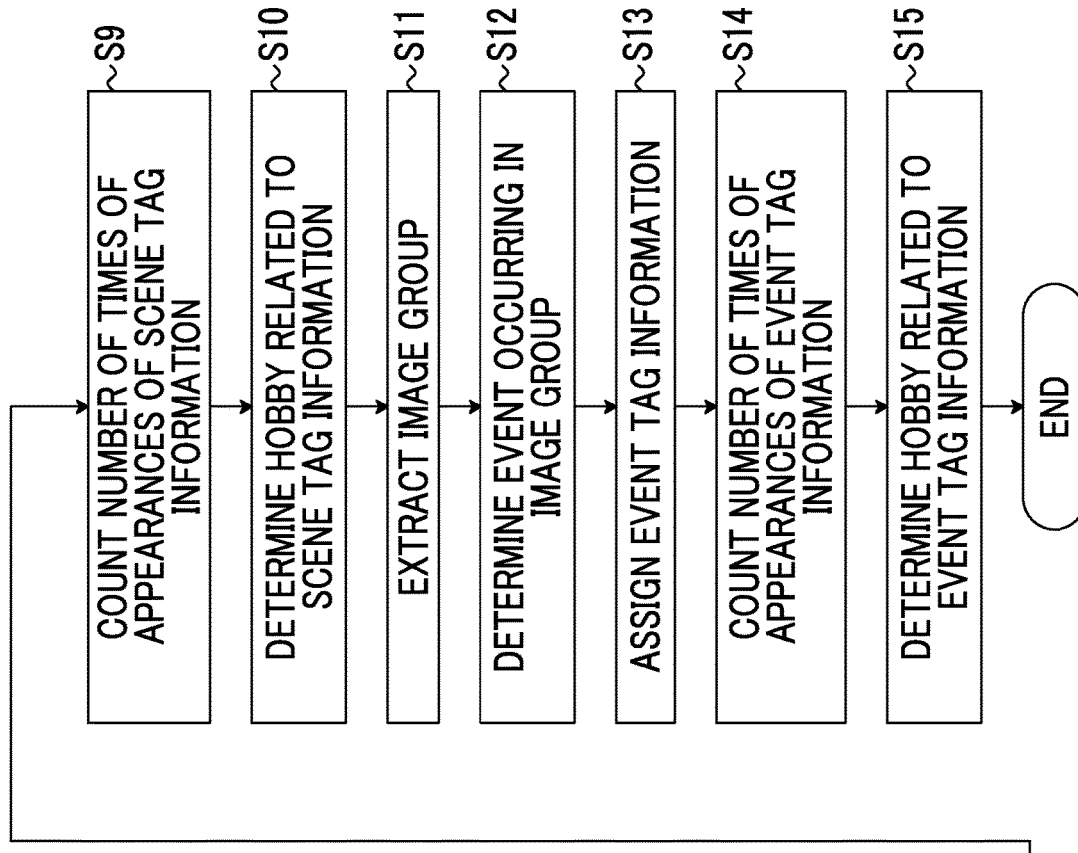
FIG. 3 is a flowchart of an embodiment showing an operation of the image processing system.
Figure 3:
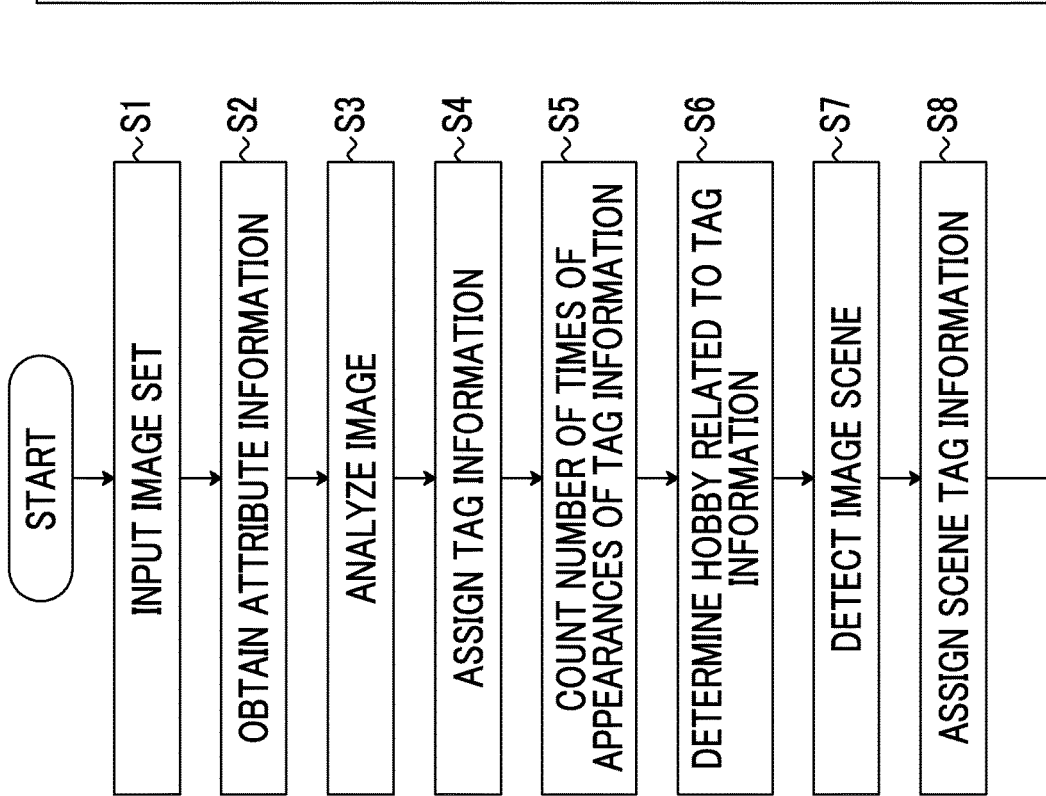
Figure 4:
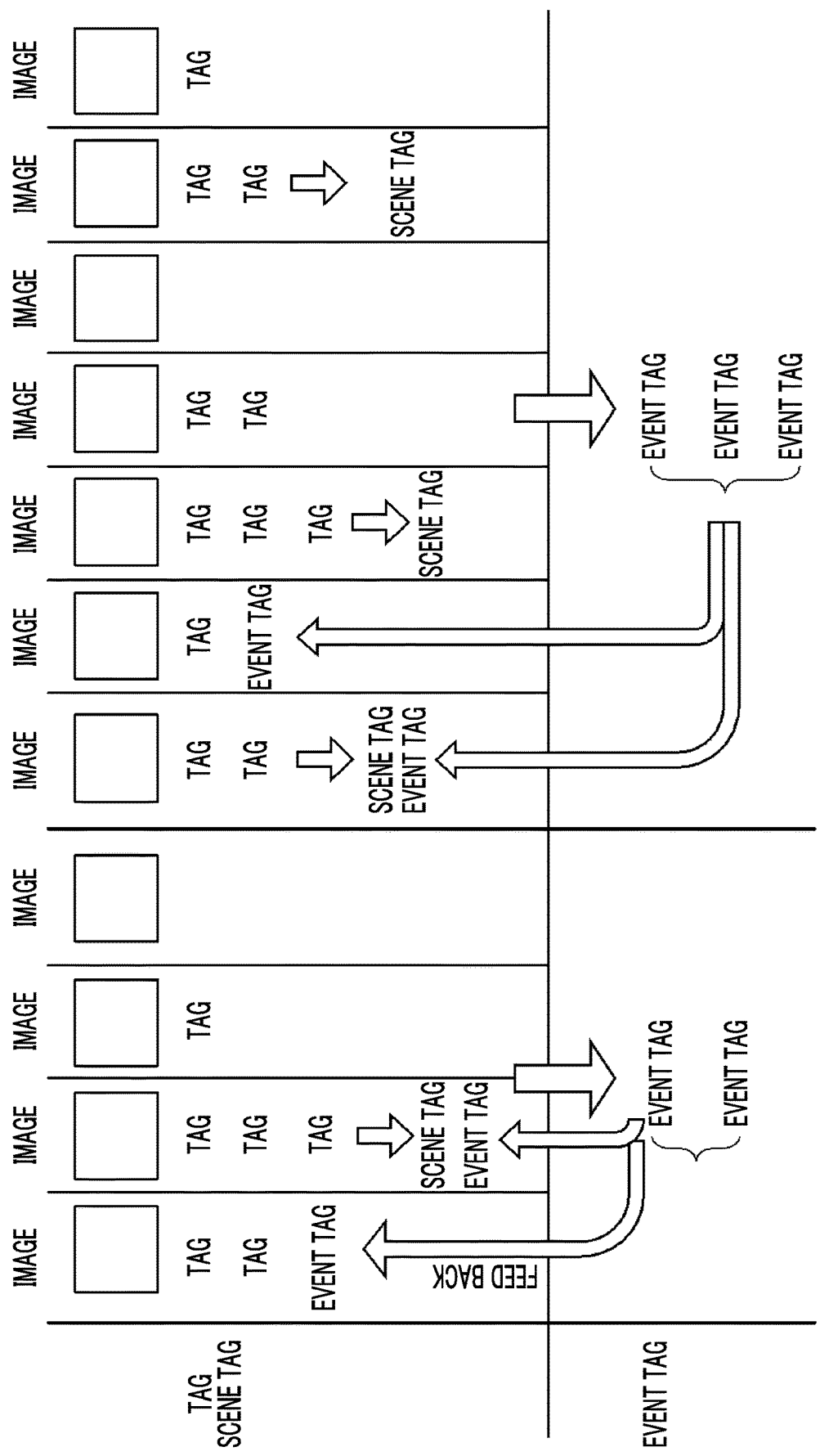
FIG. 4 is a conceptual diagram of an embodiment showing an aspect in which event tag information is assigned.

FIG. 3 is a flowchart of an embodiment showing the operation of the image processing system. FIG. 4 is a conceptual diagram of an embodiment showing an aspect in which the event tag information is assigned. In FIG. 4, two image groups included in the image set owned by the first user are illustrated.

In the client 14 owned by the first user, the image receiving unit 20 initially receives an input of the image set owned by the first user according to the command to designate the image set (S1). The image set is stored in the storage device of the client 14. The image set is uploaded to the server 12 from the client 14 via the network 16, and are stored in the storage device of the server 12.

Subsequently, the attribute information obtaining unit 22 obtains the attribute information including the imaging date and time of each image included in the image set from each image (S2).

Subsequently, the image analyzing unit 24 performs the image analysis including the subject recognition for recognizing the subject appearing in the image for each image included in the image set (S3).

Subsequently, the tag information assigning unit 26 assigns the tag information related to at least one of the attribute information of the image or the subject appearing in the image to the image for each image included in the image set (S4). As shown in FIG. 4, the number of tag information items assigned to the image is not limited to one, but two or more tag information items are assigned to the image. One tag information item is not assigned to the image.

Immediately after the input of the image set is received by the image receiving unit 20, the obtainment of the attribute information, the analysis of the image, and the assignment of the tag information may be performed. Alternatively, after the input of the image set is received by the image receiving unit 20, the obtainment of the attribute information, the analysis of the image, and the assignment of the tag information may be performed for a period for which any processing is not performed by the image processing system 10, for example, in the nighttime.

In the case of the present embodiment, the hobby of the first user is initially determined based on the tag information.

In this case, the hobby determining unit 28 counts the number of times of appearances of the tag information by using the number of imaging days of the images to which the tag information is assigned for each kind of the tag information (S5). Subsequently, the hobby determining unit 28 determines that the first user has the hobby related to the tag information of which the ratio of the number of times of the appearances counted by using the number of imaging days to the total number of times of the appearances of all kinds of tag information items assigned to the images included in the image set is equal to or greater than a threshold value (S6).

In a case where the hobby such as gourmet, electric railways, alcohol labels, or manholes of the first user is directly seen on the subject appearing in the image, that is, in a case where the hobby of the first user can be determined from only the tag information related to the subject, the hobby determining unit 28 determines that the first user has the hobby related to the tag information corresponding to the kind of which the number of times of the appearances is relatively large among all kinds of tag information items assigned to the images included in the image set owned by the first user.

For example, even though the image set is intensively captured for one day and the same kind of tag information items are assigned to many images included in the image set, the images to which these tag information items are assigned are not captured at all for the other day. That is, even though the images are intensively captured for one day and the same kind of tag information items are assigned to many images included in the image set, the first user may not necessarily have the hobby related to the tag information.

In general, the hobby is repeatedly and consistently performed. Accordingly, as in the present embodiment, it is possible to determine whether or not the hobby of the first user is the hobby performed repeatedly and consistently by counting the number of times of appearances of the tag information by using the number of imaging days of the images to which the tag information is assigned, and it is possible to accurately determine that the first user has the hobby related to the repeatedly and consistently seen tag information.

Alternatively, the hobby determining unit 28 may count the number of times of appearances of the tag information by using the number of images to which the tag information is assigned for each kind of the tag information, and may determine that the first user has the hobby related to the tag information of which the number of times of appearances of the tag information counted by using the number of images is equal to or greater than the threshold value.

For example, the hobby of the first user may be to travel abroad only once a year. Accordingly, it is possible to determine whether or not the hobby of the first user is even a hobby related to the tag information of which the number of times of the appearances is less by counting the number of times of appearances of the tag information by using the number of images to which the tag information is assigned, and it is possible to determine that the first user has this hobby.

Subsequently, the hobby of the first user is determined based on the scene tag information.

In this case, the scene detecting unit 30 detects the scene of the image based on the attribute information and the tag information of the image for each image included in the image set (S7).

Subsequently, the tag information assigning unit 26 assigns, as the tag information to the image, the scene tag information related to the scene of the image for each image included in the image set (S8). As shown in FIG. 4, the scene tag information may be or may not be assigned to the image.

Subsequently, the hobby determining unit 28 counts the number of times of appearances of the scene tag information by using the number of imaging days of the images to which the scene tag information is assigned for each kind of the scene tag information (S9). Subsequently, the hobby determining unit 28 determines that the first user has the hobby related to the scene tag information of which the ratio of the number of times of appearances of the scene tag information counted by using the number of imaging days to the total number of times of the appearances of all kinds of scene tag information items assigned to the images included in the image set is equal to or greater than the threshold value (S10).

In a case where the hobby such as "travel" and "listening to music" of the first user does not directly appear in the image, that is, in a case where it is difficult to determine the hobby of the first user from only the tag information related to the subject, the hobby determining unit 28 determines that the first user has the hobby related to the scene tag information corresponding to the kind of which the number of times of the appearances is relatively large among all kinds of scene tag information items assigned to the images included in the image set owned by the first user.

Alternatively, the hobby determining unit 28 may count the number of times of appearances of the scene tag information by using the number of images to which the scene tag information is assigned for each kind of the scene tag information, and may determine that the first user has the hobby related to the scene tag information of which the number of times of appearances of the scene tag information counted by using the number of images is equal to or greater than the threshold value.

Subsequently, the hobby of the first user is determined based on the event tag information.

In this case, the group extracting unit 32 extracts the image group from the image set based on the imaging date and time of each image (S11).

Subsequently, the event determining unit 34 determines the event occurring in the image group based on the attribute information and the tag information of the image included in the image group for each image group extracted from the image set (S12).

Subsequently, the tag information assigning unit 26 feeds, as the tag information, the event tag information related to the event back to and assigns to the event and each image which is included in the image group and is captured in the event for each event occurring in the image group extracted from the image set (S13). As shown in FIG. 4, the number of event tag information items assigned to the image group is not limited to one. Two or more event tag information items may be assigned to the image group, or one event tag information item may not be assigned to the image group.

Subsequently, the hobby determining unit 28 counts the number of times of appearances of the event tag information by using the number of imaging days of the images to which the event tag information is assigned or the number of events to which the event tag information is assigned for each kind of the event tag information (S14). Subsequently, the hobby determining unit 28 determines that the first user has the hobby related to the event tag information of which the ratio of the number of times of appearances of the event tag information counted by using the number of imaging days or the number of events to the total number of times of the appearances of all kinds of event tag information items assigned to the images included in the image set is equal to or greater than a threshold value (S15).

Similarly, in a case where the hobby of the first user does not directly appear in the image, the hobby determining unit 28 determines that the first user has the hobby related to the event tag information of which the number of times of the appearances is relatively large among all kinds of event tag information items assigned to the images included in the image set owned by the first user.

Alternatively, the hobby determining unit 28 may count the number of times of appearances of the event tag information by using the number of images to which the event tag information is assigned for each kind of the event tag information, and may determine that the first user has the hobby related to the event tag information of which the number of times of appearances of the event tag information counted by using the number of images is equal to or greater than the threshold value.

As stated above, it is possible to accurately determine the hobby of the first user even though the hobby of the first user does not directly appear in the image by determining the hobby of the first user by using the scene tag information and the event tag information.

As the threshold value used in the hobby determining unit 28, a constant value (fixed value) may be set by the image processing system 10, or may be set by the threshold value setting unit 44 for each kind of the tag information. The same is true of the scene tag information and the event tag information. A common threshold value may be set for all kinds of tag information items, or a different threshold value may be set for each kind of the tag information.

For example, it is possible to set the threshold value for the tag information related to the event for each kind of the event according to the cost at which the first user performs the event.

In this case, the cost setting unit 36 sets the cost per event for each event occurring in the image group extracted from the image set.

Subsequently, the threshold value setting unit 44 sets the threshold value to be smaller as the cost per event set by the cost setting unit 36 becomes higher.

For example, cost in a case where the first user travels once is usually considered to be higher than cost in a case where the first user eats ramen once. In a case where this event is performed at even higher cost, it is considered that the likelihood of the hobby of the first user for this event becomes higher as the cost for performing this event becomes higher. Accordingly, the threshold value for the tag information related to the travel is set so as to be lower than the threshold value for the tag information related to the ramen.

As stated above, it is possible to accurately determine the hobby of the first user by changing the threshold value according to the cost per event.

It is possible to set the threshold value for the tag information related to the event for each kind of the event according to the location in which the first user performs the event.

In this case, the home location analyzing unit 38 analyzes the home location of the first user from at least one of the imaging location included in the attribute information of each image or the account information of the first user including the information of the home location of the first user.

Subsequently, the imaging location analyzing unit 40 analyzes the imaging location of the image captured in the event based on the imaging location included in the attribute information of the image captured in the event for each event occurring in the image group extracted from the image set.

Subsequently, the distance calculating unit 42 calculates the distance between the home location and the imaging location for each event occurring in the image group extracted from the image set.

Subsequently, the threshold value setting unit 44 sets the threshold value to be smaller for this event as the distance calculated by the distance calculating unit becomes longer.

In a case where this event is performed even though the distance is long, the likelihood of the hobby of the first user for this event becomes higher as the distance between the home location and the imaging location becomes longer. Accordingly, the threshold value for the tag information related to the event of which the distance between the home location and the imaging location is long is set so as to be lower than the threshold value for the tag information related to the event of which the distance between the home location and the imaging location is short.

As stated above, it is possible to accurately determine the hobby of the first user by changing the threshold value according to the distance between the home location and the imaging location.

Tag information such as a plate, a table, or a cup related to a general subject may be included in the tag information assigned to the image by the tag information assigning unit 26. However, for example, since the plate is a general subject and the plate appears in the image captured inside the house in many cases, even though the number of times of appearances of the tag information related to the plate is large, the first user may not necessarily have the hobby related to the tag information of the plate.

For example, in a case where there is a subject frequently appears in common between all the users, it is possible to consider that this subject is a general subject and is not a target subject for determining the hobby of the first user.

Therefore, the hobby determining unit 28 may exclude tag information items of which the ratio of the number of times of appearances of the all kinds of tag information items assigned to the images included in the image set owned by all the users to the total number of times of the appearances of all kinds of tag information items assigned to the images included in the image set owned by all the users is equal to or greater than the threshold value from all kinds of tag information items assigned to the images included in the image set owned by the first user.

Accordingly, since the general subject is excluded from the target subject for determining the hobby of the user, it is possible to more accurately determine the hobby of the user.

Meanwhile, in a case where there is tag information of which the number of times of the appearances even compared to the distribution of tag information items of all the users, it is possible to consider that this tag information is an especially important hobby to this user.

Therefore, the hobby determining unit 28 may determine that the hobby related to the tag information of which the ratio of the number of times of appearances of one kind of tag information assigned to the images included in the image set owned by the first user to the number of times of appearances of one kind of tag information assigned to the images included in the image set owned by all the users is equal to or greater than the threshold value is an important hobby more than the hobby related to another tag information.

Accordingly, since it is possible to determine an especially important hobby for the user, it is possible to more accurately determine the hobby of the user.

In the image processing system 10, the first user and the second users may share the image by the image sharing unit 46.

For example, in a case where the second user shares the image owned by the second user with the first user, the first user can copy and save the shared image in a region in which the image set owned by the first user is stored in the storage device of the server 12. The image can be downloaded from the server 12 to the client 14 of the first user, and can be saved in the storage device of the client 14 of the first user. Alternatively, the first user can browse the shared image without saving the image.

In a case where the image owned by the second user is shared with the first user, the image receiving unit 20 may add the shared image as the image set owned by the first user. In this case, the shared image is also used as the image set owned by the first user, and the processing such as the obtainment of the attribute information, the analysis of the image, the assignment of the tag information, the assignment of the scene tag information, and the assignment of the event tag information is performed.

Accordingly, the shared image is added as the image set owned by the first user, and thus, it is possible to determine the hobby of the first user.

In a case where the first user saves the shared image as the image set owned by the first user, it is possible to consider that the stored image is an important image for the first user more than an image which is simply browsed and is not stored.

Therefore, in a case where a first image of the images owned by the second user which is shared with the first user is saved as the image set owned by the first user and a second image is not saved as the image set owned by the first user, the hobby determining unit 28 may perform weighting such that the number of times of appearances of the tag information assigned to the first image is greater than the number of times of appearances of the tag information assigned to the second image.

Accordingly, since the number of times of appearances of the first image can be greater than the actual number of times of the appearances, it is possible to accurately determine the hobby of the first user by prioritizing the tag information assigned to the first image over the second image.

In the image processing system 10, since it is possible to accurately determine the hobby of the first user, for example, it is possible to display contents matching the hobby of the first user, it is possible to suggest the contents to the first user, and it is possible to sell the contents.

The image processing device according to the embodiment of the present invention may not be realized by only the client 14. The server 12 may comprise one or more components of a plurality of components of the client 14.

In the device according to the embodiment of the present invention, a hardware configuration of a processing unit that performs various processing of the command obtaining unit 18, the image receiving unit 20, the attribute information obtaining unit 22, the image analyzing unit 24, the tag information assigning unit 26, the hobby determining unit 28, the scene detecting unit 30, the group extracting unit 32, the event determining unit 34, the cost setting unit 36, the home location analyzing unit 38, the imaging location analyzing unit 40, the distance calculating unit 42, the threshold value setting unit 44, the image sharing unit 46, and the communication unit 48 may be dedicated hardware, or may be various processors or computers that execute programs.

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of these various processors is an electric circuitry obtained by combining circuit elements such as semiconductor elements.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: image processing system
12: server
14: client
16: network
18: command obtaining unit
20: image receiving unit
22: attribute information obtaining unit
24: image analyzing unit
26: tag information assigning unit
28: hobby determining unit
30: scene detecting unit
32: group extracting unit
34: event determining unit
36: cost setting unit
38: home location analyzing unit
40: imaging location analyzing unit
42: distance calculating unit
44: threshold value setting unit
46: image sharing unit
48: communication unit
50: display

What is claimed is:

1. An image processing device comprising:
a processor configured to
receive an input of an image set owned by a first user;
obtain attribute information which is assigned to each image included in the image set and includes an imaging date and time of each image from each image;
perform analysis of an image including subject recognition for recognizing a subject appearing in the image for each image included in the image set;
assign tag information related to at least one of the attribute information of the image or the subject appearing in the image to the image for each image included in the image set; and
count a number of times of appearances of the tag information by using a number of imaging days of each image in the image set, to which the tag information is assigned, for each kind of the tag information, and determine that the first user has a hobby related to the tag information for which a ratio of the number of times of appearances of the tag information counted by using the number of imaging days to the total number of times of appearances of all kinds of the tag information items assigned to the images included in the image set is equal to or greater than a threshold value.

2. An image processing device comprising:
a processor configured to
receive an input of an image set owned by a first user;
obtain attribute information which is assigned to each image included in the image set and includes an imaging date and time of each image from each image;
perform analysis of the image including subject recognition for recognizing a subject appearing in the image for each image included in the image set;
assign tag information related to at least one of the attribute information of the image or the subject appearing in the image to the image for each image included in the image set; and
detect a scene of the image based on the attribute information and the tag information of the image for each image included in the image set,
wherein the processor assigns, as the tag information, scene tag information related to the scene of the image to the image for each image included in the image set, and
the processor is further configured to count a number of times of appearances of the scene tag information by using a number of imaging days of each image in the image set, to which the scene tag information is assigned, for each kind of the scene tag information, and determine that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value.

3. An image processing device comprising:
a processor configured to
receive an input of an image set owned by a first user;
obtain attribute information which is assigned to each image included in the image set and includes an imaging date and time of each image from each image;
perform analysis of the image including subject recognition for recognizing a subject appearing in the image for each image included in the image set;
assign tag information related to at least one of the attribute information of the image or the subject appearing in the image to the image for each image included in the image set;
extract an image group including two or more images from the image set based on the imaging date and time of each image; and
determine an event occurring in the image group based on the attribute information and the tag information of the image included in the image group for each image group extracted from the image set,
wherein the processor assigns, as the tag information, event tag information related to the event to the event and each image captured in the event for each event occurring in the image group extracted from the image set, and
the processor is further configured to count a image number of times of appearances of the event tag information by using a number of imaging days of each image in the image set, to which the event tag information is assigned, or the number of the events, to which the event tag information is assigned, for each kind of the event tag information, and determine that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value.

4. The image processing device according to claim 1, the processor is further configured to:
detect a scene of the image based on the attribute information and the tag information of the image for each image included in the image set,
wherein the processor assigns, as the tag information, scene tag information related to the scene of the image to the image for each image included in the image set, and
the processor counts the number of times of appearances of the scene tag information by using the number of imaging days of the images, to which the scene tag information is assigned, for each kind of the scene tag information, and determines that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value, or counts the number of times of appearances of the scene tag information by using the number of the images, to which the scene tag information is assigned, for each kind of the scene tag information, and determines that the first user has a hobby related to the scene tag information for which the number of times of appearances of the scene tag information counted by using the number of images is equal to or greater than the threshold value.

5. The image processing device according to claim 1, the processor is further configured to:
extract an image group including two or more images from the image set based on the imaging date and time of each image; and
determine an event occurring in the image group based on the attribute information and the tag information of the image included in the image group for each image group extracted from the image set,
wherein the processor assigns, as the tag information, event tag information related to the event to the event and each image captured in the event for each event occurring in the image group extracted from the image set, and
the processor counts the number of times of appearances of the event tag information by using the number of imaging days of the images, to which the event tag information is assigned, or the number of the events, to which the event tag information is assigned, for each kind of the event tag information, and determines that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value, or counts the number of times of appearances of the event tag information by using the number of the images, to which the event tag information is assigned, for each kind of the event tag information, and determines that the first user has a hobby related to the event tag information for which the number of times of appearances of the event tag information counted by using the number of images is equal to or greater than the threshold value.

6. The image processing device according to claim 1, the processor is further configured to:
set the threshold value for each kind of the tag information.

7. The image processing device according to claim 6, the processor is further configured to:
set cost per event for each event occurring in the image group extracted from the image set,
wherein the processor sets the threshold value to be smaller as the cost per event becomes higher.

8. An image processing device according to claim 7,
wherein the cost of the event is searched by using the Internet, and set an average value of searching results of a plurality of costs, as the cost of the event.

9. The image processing device according to claim 3, the processor is further configured to:
set the threshold value for each kind of the tag information.

10. The image processing device according to claim 9, the processor is further configured to:
set cost per event for each event occurring in the image group extracted from the image set,
wherein the processor sets the threshold value to be smaller as the cost per event becomes higher.

11. An image processing device according to claim 10,
wherein the cost of the event is searched by using the Internet, and set an average value of searching results of a plurality of costs, as the cost of the event.

12. The image processing device according to claim 9, the processor is further configured to:
analyze a home location of the first user from at least one of an imaging location included in the attribute information of each image or account information of the first user including information of the home location of the first user;
analyze an imaging location of the image captured in the event based on the imaging location included in the attribute information of the image captured in the event for each event occurring in the image group extracted from the image set; and
calculate a distance between the home location and the imaging location for each event occurring in the image group extracted from the image set,
wherein the processor sets the threshold value to be smaller as the distance becomes longer.

13. The image processing device according to claim 1,
wherein the processor excludes the tag information, among all kinds of the tag information items assigned to the images included in the image set owned by all the users, of which the ratio of the number of times of appearances to the total number of times of appearances of all kinds of the tag information items assigned to the images included in the image sets owned by all the users is equal to or greater than a threshold value from all kinds of the tag information items assigned to the images included in the image set owned by the first user.

14. The image processing device according to claim 1,
wherein the processor determines that a hobby related to the tag information of which the ratio of the number of times of appearances of one kind of the tag information assigned to the images included in the image set owned by the first user to the number of times of appearances of the one kind of the tag information assigned to the images included in the image sets owned by all the users is equal to or greater than a threshold value is an important hobby more than a hobby related to another tag information.

15. The image processing device according to claim 1, the processor is further configured to:
share images between the first user and a second user,
wherein, in a case where images owned by the second user are shared with the first user, the processor adds the shared images as the image set owned by the first user.

16. The image processing device according to claim 15,
wherein, in a case where among the images which are shared with the first user and are owned by the second user, a first image is saved as the image set owned by the first user and a second image is not saved as the image set owned by the first user, the processor performs weighting such that the number of times of appearances of the tag information assigned to the first image is greater than the number of times of appearances of the tag information assigned to the second image.

17. An image processing method comprising:
receiving an input of an image set owned by a first user;
obtaining attribute information which is assigned to each image included in the image set and includes an imaging date and time of each image from each image;
performing analysis of the image including subject recognition for recognizing a subject appearing in the image for each image included in the image set;
assigning tag information related to at least one of the attribute information of the image or the subject appearing in the image to the image for each image included in the image set; and
counting a number of times of appearances of the tag information by using a number of imaging days of each image in the image set, to which the tag information is assigned, for each kind of the tag information, and determining that the first user has a hobby related to the tag information for which a ratio of the number of times of appearances of the tag information counted by using the number of imaging days to the total number of times of appearances of all kinds of the tag information items assigned to the images included in the image set is equal to or greater than a threshold value.

18. The image processing method according to claim 17, further comprising:
detecting a scene of the image based on the attribute information and the tag information of the image for each image included in the image set;
assigning as the tag information, scene tag information related to the scene of the image to the image for each image included in the image set; and counting the number of times of appearances of the scene tag information by using the number of imaging days of the images, to which the scene tag information is assigned, for each kind of the scene tag information, and determining that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value, or counting the number of times of appearances of the scene tag information by using the number of the images, to which the scene tag information is assigned, for each kind of the scene tag information, and determining that the first user has a hobby related to the scene tag information for which the number of times of appearances of the scene tag information counted by using the number of images is equal to or greater than the threshold value.

19. An image processing method comprising:
receiving an input of an image set owned by a first user;
obtaining attribute information which is assigned to each image included in the image set and includes an imaging date and time of each image from each image;
performing analysis of the image including subject recognition for recognizing a subject appearing in the image for each image included in the image set;
assigning tag information related to at least one of the attribute information of the image or the subject appearing in the image to the image for each image included in the image set;
detecting a scene of the image based on the attribute information and the tag information of the image for each image included in the image set;
assigning as the tag information, scene tag information related to the scene of the image to the image for each image included in the image set; and
counting a number of times of appearances of the scene tag information by using a number of imaging days of each image in the image set, to which the scene tag information is assigned, for each kind of the scene tag information, and determining that the first user has a hobby related to the scene tag information for which a ratio of the number of times of appearances of the scene tag information counted by using the number of imaging days to the total number of times of appearances of all kinds of the scene tag information items assigned to the images included in the image set is equal to or greater than a threshold value.

20. An image processing method comprising:
receiving an input of an image set owned by a first user;
obtaining attribute information which is assigned to each image included in the image set and includes an imaging date and time of each image from each image;
performing analysis of the image including subject recognition for recognizing a subject appearing in the image for each image included in the image set;
assigning tag information related to at least one of the attribute information of the image or the subject appearing in the image to the image for each image included in the image set;
extracting an image group including two or more images from the image set based on the imaging date and time of each image;
determining an event occurring in the image group based on the attribute information and the tag information of the image included in the image group for each image group extracted from the image set;
assigning as the tag information, event tag information related to the event to the event and each image captured in the event for each event occurring in the image group extracted from the image set; and
counting a number of times of appearances of the event tag information by using a number of imaging days of each image in the image set, to which the event tag information is assigned, or the number of the events, to which the event tag information is assigned, for each kind of the event tag information, and determining that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value.

21. The image processing method according to claim 17, further comprising:
extracting an image group including two or more images from the image set based on the imaging date and time of each image;
determining an event occurring in the image group based on the attribute information and the tag information of the image included in the image group for each image group extracted from the image set;
assigning as the tag information, event tag information related to the event to the event and each image captured in the event for each event occurring in the image group extracted from the image set; and
counting the number of times of appearances of the event tag information by using the number of imaging days of the images, to which the event tag information is assigned, or the number of the events, to which the event tag information is assigned, for each kind of the event tag information, and determining that the first user has a hobby related to the event tag information for which a ratio of the number of times of appearances of the event tag information counted by using the number of imaging days or the number of events to the total number of times of appearances of all kinds of the event tag information items assigned to the images included in the image set is equal to or greater than a threshold value, or counting the number of times of appearances of the event tag information by using the number of the images, to which the event tag information is assigned, for each kind of the event tag information, and determining that the first user has a hobby related to the event tag information for which the number of times of appearances of the event tag information counted by using the number of images is equal to or greater than the threshold value.

22. A non-transitory computer-readable recording medium having a program causing a computer to execute the steps of the image processing method according to claim 17 recorded thereon.

23. An image processing device comprising:
a processor configured to
receive an input of an image set owned by a first user;
obtain attribute information which is assigned to each image included in the image set and includes an imaging date and time of each image from each image;

perform analysis of the image including subject recognition for recognizing a subject appearing in the image for each image included in the image set;

assign tag information related to at least one of the attribute information of the image or the subject appearing in the image to the image for each image included in the image set;

extract an image group including two or more images from the image set based on the imaging date and time of each image; and determine an event occurring in the image group based on the attribute information and the tag information of the image included in the image group for each image group extracted from the image set, wherein the processor assigns, as the tag information, event tag information related to the event to the event and each image captured in the event for each event occurring in the image group extracted from the image set, the processor is further configured to count a number of times of appearances of the event tag information by using a number of the each image in the image set, to which the event tag information is assigned, for each kind of the event tag information, and determine that the first user has a hobby related to the event tag information for which the number of times of appearances of the event tag information counted by using the number of images is equal to or greater than the threshold value, the processor is further configured to
set the threshold value for each kind of the tag information, and
set cost per event for each event occurring in the image group extracted from the image set, and the processor sets the threshold value to be smaller as the cost per event becomes higher.

24. An image processing device according to claim 23, wherein the cost of the event is searched by using the Internet, and set an average value of searching results of a plurality of costs, as the cost of the event.

* * * * *